(12) United States Patent
Ramsey et al.

(10) Patent No.: US 11,941,723 B2
(45) Date of Patent: Mar. 26, 2024

(54) DYNAMIC DISPATCH FOR WORKGROUP DISTRIBUTION

(71) Applicant: ADVANCED MICRO DEVICES, INC., Santa Clara, CA (US)

(72) Inventors: Randy Ramsey, Santa Clara, CA (US); Yash Ukidave, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 156 days.

(21) Appl. No.: 17/564,291

(22) Filed: Dec. 29, 2021

(65) Prior Publication Data
US 2023/0206382 A1 Jun. 29, 2023

(51) Int. Cl.
*G06T 1/20* (2006.01)
*G06T 15/80* (2011.01)

(52) U.S. Cl.
CPC ............... *G06T 1/20* (2013.01); *G06T 15/80* (2013.01)

(58) Field of Classification Search
CPC .............. G06T 1/20; G06T 1/60; G06T 15/80
USPC .................................................. 345/426, 502
See application file for complete search history.

(56) References Cited

U.S. PATENT DOCUMENTS

| 8,854,381 | B2 | 10/2014 | Mantor et al. | |
|---|---|---|---|---|
| 10,901,777 | B1* | 1/2021 | Havlir | G06F 9/461 |
| 2007/0091088 | A1* | 4/2007 | Jiao | G06T 15/005 |
| | | | | 345/426 |
| 2007/0091089 | A1* | 4/2007 | Jiao | G06T 15/80 |
| | | | | 345/426 |
| 2015/0235341 | A1 | 8/2015 | Mei et al. | |
| 2017/0199558 | A1* | 7/2017 | Farazmand | G06F 1/3296 |
| 2017/0250850 | A1 | 8/2017 | Urbach | |
| 2018/0321946 | A1 | 11/2018 | Hartog et al. | |
| 2021/0216368 | A1 | 7/2021 | Gutierrez et al. | |

FOREIGN PATENT DOCUMENTS

EP  2593860  5/2013

OTHER PUBLICATIONS

International Search Report and Written Opinion issued in Application No. PCT/US2022/051521, dated Apr. 7, 2023, 10 pages.

\* cited by examiner

*Primary Examiner* — Jacinta M Crawford

(57) ABSTRACT

Systems, methods, and techniques dynamically utilize load balancing for workgroup assignments between a group of shader engines by a command processor of a graphics processing unit (GPU). Based on one or more commands received for execution, a plurality of workgroups is generated for assignment to a plurality of shader engines for processing, each shader engine including a respective quantity of active compute units. Each workgroup of the plurality of workgroups is dynamically assigned to a respective shader engine for execution based at least in part on indications of available resources respectively associated with each of the shader engines. In various embodiments, the indications of available resources may include physical parameters regarding each shader engine, as well as current status information regarding the processing of workgroups assigned to each shader engine.

20 Claims, 4 Drawing Sheets

DYNAMIC DISPATCH FOR WORKGROUP DISTRIBUTION

BACKGROUND

Computer processing systems typically include a central processing unit (CPU) and a graphics processing unit (GPU). The CPU hosts an operating system (OS) and handles memory management tasks such as allocating virtual memory address spaces, configuring page tables including virtual-to-physical memory address translations, managing translation lookaside buffers, memory management units, input/output memory management units, and the like. The CPU also launches kernels for execution on the GPU, e.g., by issuing draw calls. The GPU typically implements multiple compute units that allow the GPU to execute the kernel as multiple threads, often executing the same instructions on different data sets. The threads are grouped into workgroups that are executed concurrently or in parallel on corresponding compute units.

BRIEF SUMMARY OF EMBODIMENTS

Embodiments are described herein for dynamically load balancing workgroup assignments between a group of shader engines by a command processor of a graphics processing unit (GPU). Based on one or more commands received for execution, a plurality of workgroups is generated for assignment to a plurality of shader engines for processing, each shader engine including a respective quantity of active compute units. Each workgroup of the plurality of workgroups is dynamically assigned to a respective shader engine for execution based at least in part on indications of available resources respectively associated with each of the shader engines. In various embodiments, the indications of available resources may include physical parameters regarding each shader engine, as well as current status information regarding the processing of workgroups assigned to each shader engine.

In certain embodiments, a graphics processing device may include a plurality of shader engines, wherein each shader engine of the plurality of shader engines includes a respective quantity of active compute units; a command processor coupled to the plurality of shader engines; and a dispatch controller of the command processor to dynamically assign, based at least in part on one or more indications of available resources respectively associated with each of at least some shader engines of the plurality of shader engines, each workgroup of a plurality of workgroups to a respective shader engine for execution. In certain embodiments, the command processor may be to receive one or more commands for execution and to generate the plurality of workgroups based on the one or more commands for assignment to the plurality of shader engines.

At least one indication of available resources associated with a first shader engine of the at least some shader engines may include an indication of one or more physical parameters associated with the first shader engine, such that the one or more physical parameters specify the respective quantity of active compute units associated with the first shader engine.

The dispatch controller of the command processor may further be to receive, from a first shader engine of the at least some shader engines, one of the one or more indications of available resources for the first shader engine.

To dynamically assign each workgroup to a respective shader engine may include to dynamically assign each workgroup to a respective shader engine via a shader processor input (SPI) associated with the respective shader engine, such that the indication of available resources associated with the respective shader engine includes status information received by the command processor from the associated SPI. The status information may include an indication of current progress of the respective shader engine with respect to processing one or more workgroups assigned to the respective shader engine. The status information may include an indication of one or more available workgroup assignment slots of the respective shader engine.

The command processor may further be to maintain current status information for each shader engine of the at least some shader engines based at least in part on the one or more indications of available resources respectively associated with each of the at least some shader engines.

In certain embodiments, a method may include generating, based on one or more received commands, a plurality of workgroups for assignment to a plurality of shader engines for processing, each shader engine of the plurality of shader engines including a respective quantity of active compute units; and dynamically assigning, based at least in part on one or more indications of available resources respectively associated with each of at least some shader engines of the plurality of shader engines, each workgroup of the plurality of workgroups to a respective shader engine for execution.

At least one indication of the available resources associated with a first shader engine of the at least some shader engines may include one or more physical parameters associated with the first shader engine, the one or more physical parameters specifying the respective quantity of active compute units associated with the first shader engine.

The method may further include receiving, by a dispatch controller of a command processor, one of the one or more indications of available resources for a first shader engine of the at least some shader engines from the first shader engine.

Dynamically assigning each workgroup to a respective shader engine may include dynamically assigning each workgroup to a respective shader engine via a shader processor input (SPI) associated with the respective shader engine, such that the indication of available resources associated with the respective shader engine includes status information received by a command processor from the associated SPI. The status information may include an indication of current progress of the respective shader engine in processing one or more workgroups assigned to the respective shader engine. The status information may include an indication of one or more available workgroup assignment slots of the respective shader engine.

The method may further include maintaining, by a command processor, current status information for each shader engine of the at least some shader engines based at least in part on the one or more indications of available resources respectively associated with each of the at least some shader engines.

In certain embodiments, a system may comprise a plurality of graphics processing devices, such that each graphics processing device of the plurality of graphics processing devices includes a plurality of shader engines and a command processor coupled to the plurality of shader engines. Each shader engine of the plurality of shader engines includes a respective quantity of active compute units. A dispatch controller of the command processor may be to dynamically assign, based at least in part on one or more indications of available resources respectively associated with each of at least some shader engines of the plurality of shader engines, each workgroup of a plurality of workgroups to a respective shader engine for execution. Each dispatch controller of each graphics processing device of the plurality of graphics processing devices may coordinate with one or more other dispatch controllers of one or more other graphics processing devices of the plurality of graphics processing devices to dynamically assign workgroups. The command processor may be to receive one or more commands for execution and to generate the plurality of workgroups based on the one or more commands for assignment to the plurality of shader engines.

Each graphics processing device of the plurality of graphics processing devices may comprise a graphics processing unit (GPU) chiplet.

The available resources respectively associated with each of the at least some shader engines may include a respective quantity of active compute units associated with each of the at least some shader engines.

At least one of the one or more indications of available resources associated with a first shader engine of the plurality of shader engines may be provided by the first shader engine.

The one or more indications of available resources respectively associated with a first shader engine of the at least some shader engines may include status information for the first shader engine, such that the status information includes an indication of current progress of the first shader engine with respect to processing one or more workgroups assigned to the first shader engine.

The one or more indications of available resources respectively associated with a first shader engine of the at least some shader engines may include status information for the first shader engine, such that the status information includes an indication of one or more available workgroup assignment slots of the first shader engine.

The command processor may further be to maintain current status information for each shader engine of the at least some shader engines based at least in part on the one or more indications of available resources respectively associated with each of the at least some shader engines.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
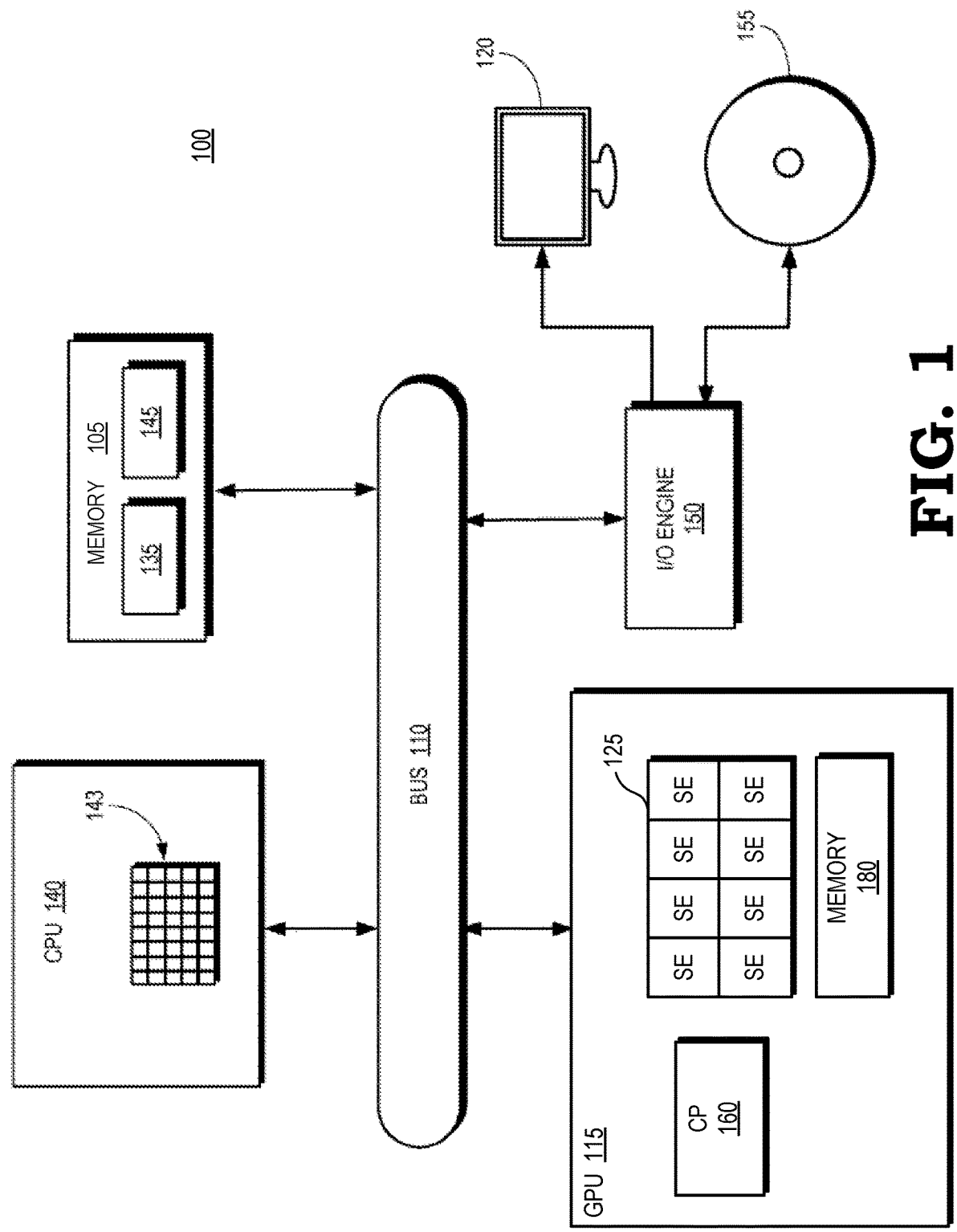
FIG. 1 is a block diagram of a processing system in accordance with some embodiments.

Typical approaches to workgroup load-balancing for a group of shader engines have involved round-robin style or other type of load-balancing based on static parameters. However, such static approaches generally assume that workgroups (collections of processing threads) assigned to those shader engines are associated with substantially similar, if not identical, consumption of shader engine processing time and other resources. In actuality, in various scenarios different workgroups consume disparate amounts of shader engine time and resources, even when those workgroups are ostensibly similar or identical. As one non-limiting example, one or more workgroups assigned to a first shader engine may be associated with a greater quantity of memory and/or cache conflicts than other workgroups assigned to a second shader engine for processing, causing higher latency (and commensurately longer processing time) for the first shader engine than the second.

Moreover, due to variations in silicon die manufacturing processes and associated tolerances, shader engines designed and intended to be identical may in fact include disparate quantities of viable compute units, typically leading to corresponding disparities in a quantity of active compute units (and therefore processing efficiency) associated with each respective shader engine in a graphics processing unit (GPU), GPU core, or GPU chiplet resulting from those manufacturing processes.

Typically, a graphics processing unit (GPU) or other graphics processing device includes a command processor with a dispatch unit to dispatch workgroups to different execution units. However, in chiplet-based GPU designs or other designs with distributed elements—such as distributed shader engines, arithmetic logic units (ALUs), compute units, or other processing units—this arrangement is relatively inefficient.

Techniques are described herein for distributed dispatch using dynamic workload balancing in an architecture that includes one or more GPUs, GPU cores, or chiplets, each including multiple shader engines that in turn each include a respective quantity of compute units. In certain embodiments, such GPUs, GPU cores, or chiplets may communicate via a high-performance interconnection such as a peripheral component interconnect (PCI, PCI-E) bus. As used herein, a compute unit refers to one of many parallel vector processors in a GPU that contain parallel ALUs. Also as used herein, the term "chiplet" may refer to any active die (e.g., a silicon die) formed on a substrate and containing at least a portion of the computational logic used to solve a full problem (such that a computational workload is distributed across multiples of these active dies), and for which an associated programming model treats a combination of these separate computational dies as a single monolithic unit. In certain scenarios, the GPUs, GPU cores, or chiplets may be referred to herein as "processing units."

In various embodiments, by distributing dispatch across multiple chiplets in a processing system, divergent workloads may be assigned to the different chiplets, such that in certain circumstances the different workloads may be executed at different frequencies, thereby enhancing overall efficiency of the GPU.

FIG. 1 is a block diagram of a processing system 100 in accordance with some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. In the illustrated embodiment, the GPU 115 implements multiple shader engines 125 that are configured to execute instructions concurrently or in parallel. It will be appreciated that while discussion herein may center on specific operations involving one or more pluralities of shader arrays and/or shader engines, in certain embodiments the techniques discussed may include operations by other elements as well. For example, in various embodiments one or more processing units that operate on geometry primitives and/or pixel workloads may be implemented using fixed function hardware blocks, shader engines, or a combination thereof. Thus, discussions herein pertaining to embodiments that include a quantity of shader engines may also apply to embodiments with a similar or disparate quantity of shader engines, fixed function hardware blocks, or combination thereof.

The GPU 115 also includes an internal (or on-chip) memory 180 that includes a local data store, as well as caches, registers, or buffers utilized by the shader engines 125. The internal memory 180 stores data structures that describe workgroups executing on one or more of the shader engines 125. In the illustrated embodiment, the GPU 115 communicates with the memory 105 over the bus 110. In other embodiments, the GPU 115 may communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 135 of instructions from a program code that is to be executed by the GPU 115.

The processing system 100 also includes a central processing unit (CPU) 140 that is connected to the bus 110 and can therefore communicate with the GPU 115 and the memory 105 via the bus 110. In the illustrated embodiment, the CPU 140 implements multiple processing elements (also referred to as processor cores) 143 that are configured to execute instructions concurrently or in parallel. The CPU 140 can execute instructions such as program code 145 stored in the memory 105 and the CPU 140 can store information in the memory 105 such as the results of the executed instructions. The CPU 140 is also able to initiate graphics processing by issuing draw calls to the GPU 115.

An input/output (I/O) engine 150 handles input or output operations associated with the display 120, as well as other elements of the processing system 100 such as keyboards, mice, printers, external disks, and the like. The I/O engine 150 is coupled to the bus 110 so that the I/O engine 150 communicates with the memory 105, the GPU 115, or the CPU 140. In the illustrated embodiment, the I/O engine 150 is configured to read information stored on an external storage component 155, which is implemented using a non-transitory computer readable medium such as a compact disk (CD), a digital video disc (DVD), and the like. The I/O engine 150 can also write information to the external storage component 155, such as the results of processing by the GPU 115 or the CPU 140.

In operation, the CPU 140 issues commands or instructions (referred to herein as "draw calls") to the GPU 115 to initiate processing of a kernel that represents the program instructions to be executed by the GPU 115. Multiple instances of the kernel, referred to herein as threads or work items, are executed concurrently or in parallel using subsets of the shader engines 125. In some embodiments, the threads execute according to single-instruction-multiple-data (SIMD) protocols so that at least some threads execute the same instruction(s) on different input data. The threads are typically collected into workgroups that are executed on different shader engines 125.

Figure 2:
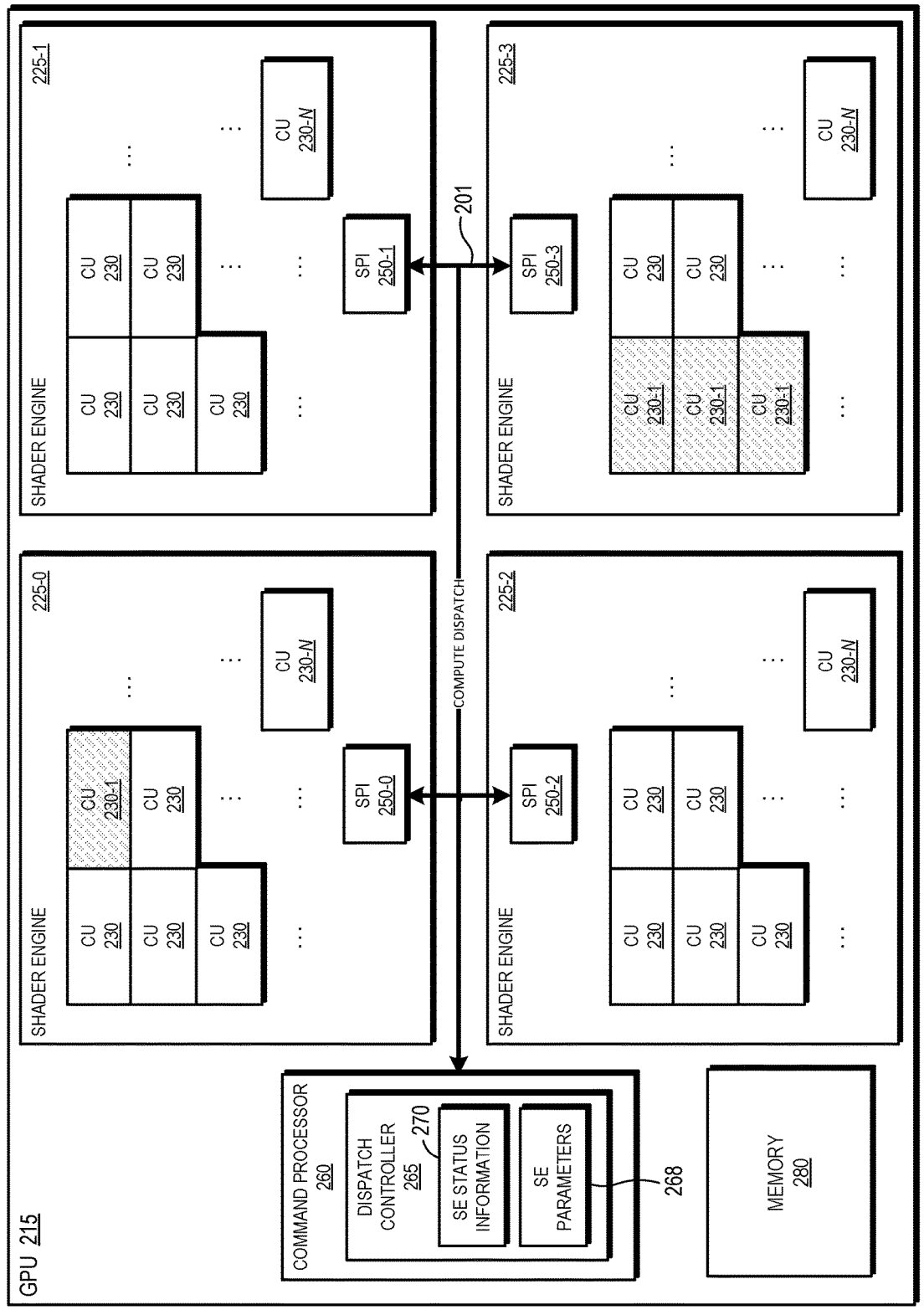
FIG. 2 is a block diagram of various components of a graphics processing unit in accordance with some embodiments.
Figure 3:
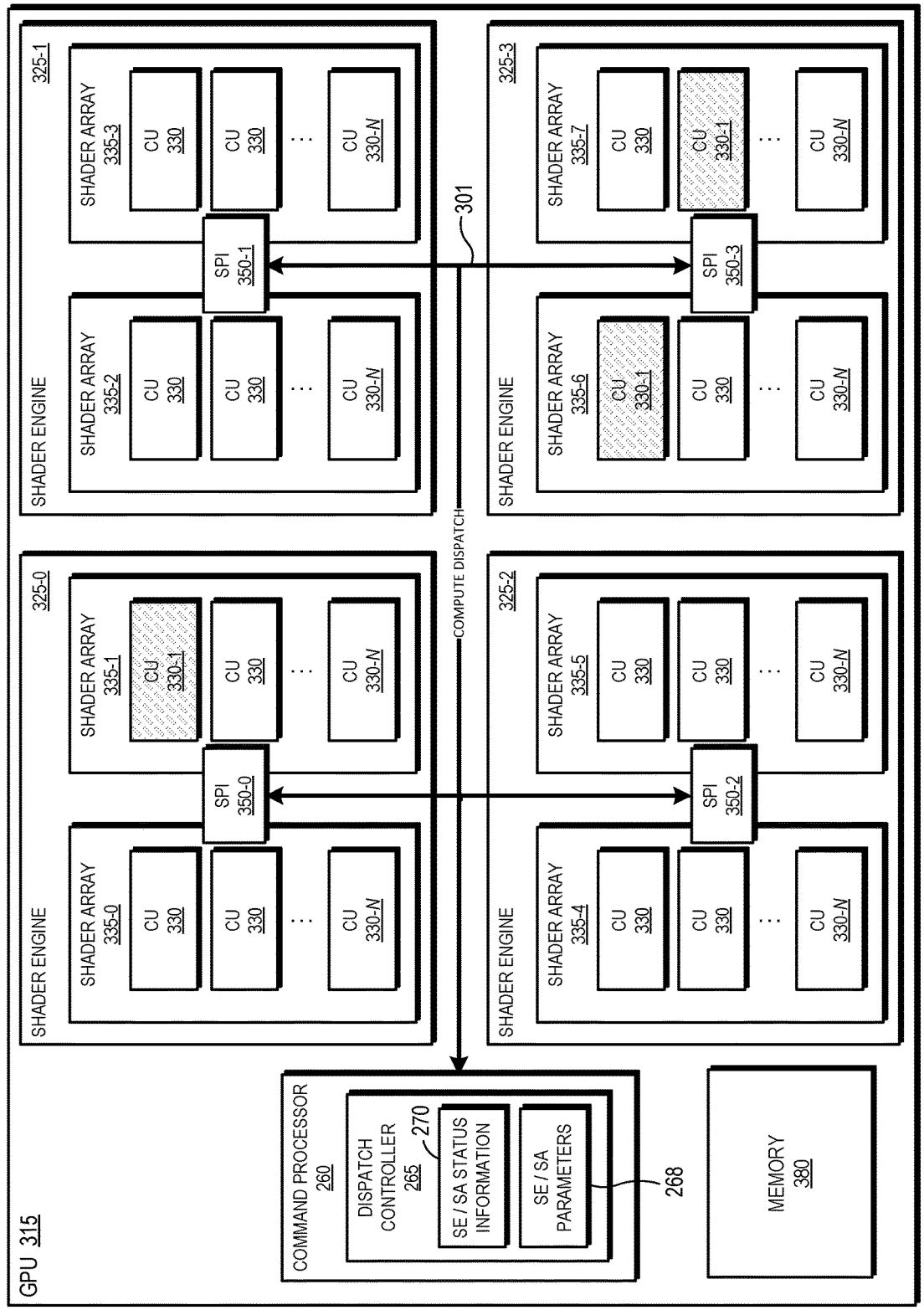
FIG. 3 is a block diagram of various components of another graphics processing unit in accordance with some embodiments.

In the depicted embodiment, the GPU 115 includes a command processor 160, which dispatches workgroups to the shader engines 125 via a dispatch controller (not shown here, but examples of which include dispatch controller 265 of FIG. 2 and dispatch controller 365 of FIG. 3, discussed elsewhere herein), which in operation dynamically assigns each workgroup of a plurality of workgroups to one or more shader engines for execution based at least in part on indications of available resources respectively associated with each of the shader engines. In certain embodiments, the command processor may include the dispatch controller; in other embodiments, the dispatch controller may be separate from but communicatively coupled to the command processor. In certain embodiments, the GPU 115 may include multiple command processors 160, which in operation may cooperate with one another in order to coordinate assignment of workgroups to respective shader engines or other processing elements. For example, in certain embodiments workload distribution and/or coordination across multiple command processors (and possibly multiple corresponding dispatch controllers) may include one or more dynamic adjustments to an amount of one or more workloads "owned" by each command processor based at least in part on capabilities associated with each command processor's associated shader engines.

FIG. 2 is a block diagram of a graphics processing unit 215 in accordance with some embodiments. In the depicted embodiment, the GPU 215 includes a command processor 260, a plurality of shader engines 225-0, 225-1, 225-2, 225-3 (collectively referred to herein as shader engines 225), and an internal memory 280. In the depicted embodiment, the internal memory 280 includes a local data store, as well as caches, registers, or buffers utilized by the shader engines 125, and may also store data structures that describe workgroups for execution by one or more of the shader engines 225.

Command processor 260 is communicatively coupled to a corresponding shader processor input (SPI, which in certain embodiments may be termed a shader resource manager) in each of the shader engines 225 via compute dispatch bus 201. Collectively referred to herein as SPIs 250, SPI 250-0 is included within and corresponds to shader engine 225-0, SPI 250-1 is included within and corresponds to shader engine 225-1, SPI 250-2 is included within and corresponds to shader engine 225-2, and SPI 250-3 is included within and corresponds to shader engine 225-3. Each of the shader engines 225 respectively includes a corresponding plurality of compute units 230 for executing workgroups assigned to the respective shader engine. In one or more other embodiments, to or more compute units in each of at least some of the multiple shader engines (and/or shader arrays) may be grouped into one or more additional subgroups, such as to group two or more compute units in a workgroup processor (WGP) configuration, two or more shader arrays, etc. In such embodiments, each shader engine (and/or shader array) may include any quantity of such subgroups, just as the embodiment of GPU 215 may include any quantity N of compute units 230.

In the depicted embodiment, shader engines 225-0 and 225-3 also include a quantity of inactive compute units 230-1. In various scenarios and embodiments, the inactive compute units 230-1 may represent non-viable portions of a silicon die used when fabricating the inactive compute units, or may result from other manufacturing errors. In certain scenarios, for example, a compute unit may be operational but "turned off" or otherwise rendered inactive due to a failure of the compute unit to meet one or more manufacturing tolerance criteria. Whatever the reason for such compute units being inactive, the result is that a respective quantity of active compute units associated with shader engines 225-0 and 225-3 is less than a respective quantity N of active compute units associated with shader engines 225-1 or 225-2. As discussed elsewhere herein, such disparities in a respective quantity of active compute units may lead to corresponding disparities in processing efficiency and/or bandwidth respectively provided by the shader engines 225.

Continuing with the embodiment depicted in FIG. 2, the command processor 260 includes a dispatch controller 265, which in operation assigns workgroups generated by the command processor 262 each of shader engines 225 for processing by their respective collections of compute units 230. In the depicted embodiment, the dispatch controller 265 stores shader engine physical parameters 268 and shader engine status information 270, such as in a plurality of registers of the dispatch controller. In other embodiments and scenarios, the shader engine physical parameters 268 and shader engine status information 270 may be stored in the internal memory 280.

In operation, a CPU communicatively coupled to the GPU 215 sends draw commands to the command processor 260, which generates individual shader workgroups for processing by the shader engines 225. Dispatch controller 265 assigns one or more of those workgroups to a respective shader engine by sending information indicative of those assigned workgroups to a corresponding SPI for that respective shader engine via the compute dispatch bus 201. The respective shader engine then distributes the workgroups to the compute units 230 included in that shader engine's plurality of compute units for processing, such as via a shader engine scheduler (not shown in the interest of clarity).

Also during operation, the SPI 250 provides reporting information to the dispatch controller 265 via compute dispatch bus 201 regarding the respective corresponding shader engine's progress with respect to its current workgroups (e.g., to indicate that its corresponding shader engine has completed one or more currently assigned workgroups, that its corresponding shader engine has a specified quantity or proportion of available workgroup execution inputs or "slots," etc.), and in certain embodiments may include updates regarding one or more physical parameters of the shader engine as well (such as if a quantity of active compute units in the shader engine has changed). As a result of such reporting information, the dispatch controller 265 may dynamically determine workgroup assignments for each of the respective shader engines 225 based at least in part on current status information for each such shader engine, as well as on physical parameters for each such shader engine.

FIG. 3 is a block diagram of another graphics processing unit 315 in accordance with some embodiments. In the depicted embodiment, the GPU 315 includes a command processor 360, a plurality of shader engines 325-0, 325-1, 325-2, 325-3 (collectively referred to herein as shader engines 325), and an internal memory 380. As with internal memory 280 of the GPU 215 of FIG. 2, in the depicted embodiment, the internal memory 380 includes a local data store; caches, registers, or buffers utilized by the shader engines 125; and data structures that describe workgroups for execution by one or more of the shader engines 325.

Command processor 360 is communicatively coupled to a corresponding SPI in each of the shader engines 325 via compute dispatch bus 301. Collectively referred to herein as SPIs 350, SPI 350-0 is included within and corresponds to shader engine 325-0, SPI 350-1 is included within and corresponds to shader engine 325-1, SPI 350-2 is included within and corresponds to shader engine 325-2, and SPI 350-3 is included within and corresponds to shader engine 325-3.

In contrast to those in the example of GPU 215 (in FIG. 2), while each of the shader engines 325 respectively includes a corresponding plurality of compute units 330 for executing workgroups assigned to the respective shader engine, those compute units are arranged in two distinct shader arrays within each respective shader engine. In particular, shader engine 325-0 includes shader arrays 335-0 and 335-1; shader engine 325-1 includes shader arrays 335-2 and 335-3; shader engine 325-2 includes shader arrays 335-4 and 335-5; and shader engine 325-3 includes shader arrays 335-6 and 335-7. Collectively, such shader arrays are referred to herein as shader arrays 335.

Shader engines 325-0 and 325-3 include a quantity of inactive compute units 330-1, indicating that a respective quantity of active compute units associated with shader engines 325-0 and 325-3 is less than a respective quantity N of active compute units associated with shader engines 325-1 or 325-2. As described elsewhere herein, such disparities may lead to corresponding disparities in processing efficiency and/or bandwidth respectively provided by each of the shader engines 325.

Command processor 360 includes a dispatch controller 365, which in operation assigns workgroups generated by the command processor 362 each of shader engines 325 for processing by their respective collections of compute units 330. In the depicted embodiment of FIG. 3, the dispatch controller 365 stores physical parameters 368 and status information 370, but such parameters and information may relate not only to physical parameters and status information for the respective shader engines 325, but also to corresponding parameters and information for the individual shader arrays within those respective shader engines. In other embodiments and scenarios, the physical parameters 368 and status information 370 may be stored in the internal memory 380.

Figure 4:
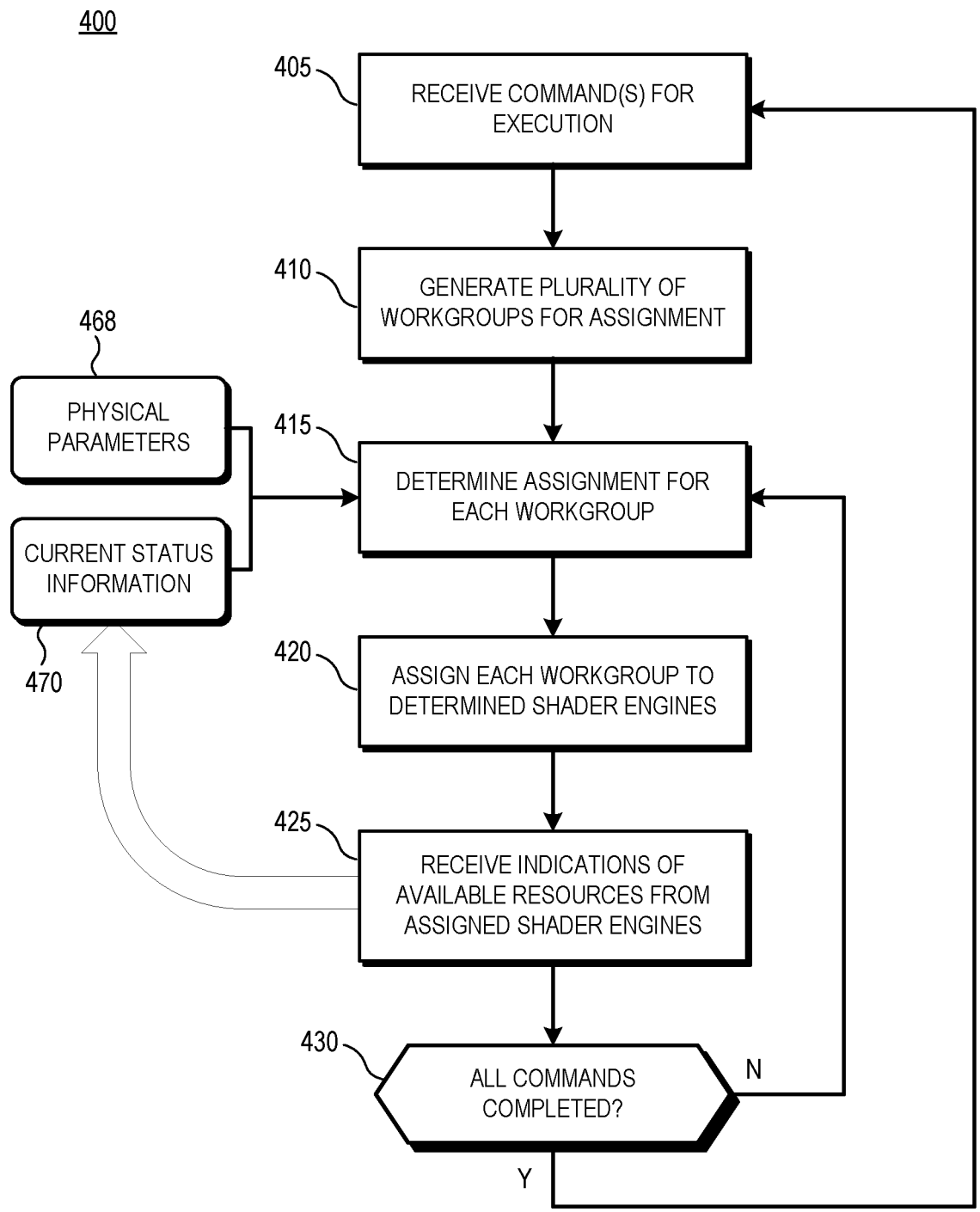
FIG. 4 is a block diagram illustrating an overview of an operational routine of a command processor in accordance with one or more embodiments.

FIG. 4 is a block diagram illustrating an overview of an operational routine 400 of a command processor of a graphics processing unit in accordance with one or more embodiments. The operational routine 400 may be performed, for example, by one or more instances of command processor 160 of FIG. 1; command processor 260 and/or dispatch controller 265 of FIG. 2; or command processor 360 and/or dispatch controller 365 of FIG. 3.

The routine begins at block 405, in which the command processor receives one or more commands (e.g., draw commands from a CPU communicatively coupled to the GPU) for processing by one or more shader engines of a plurality of shader engines coupled to the command processor. The routine proceeds to block 410.

At block 410, the command processor generates a plurality of workgroups for assignment to the plurality of shader engines for processing. The routine proceeds to block 415.

At block 415, the command processor dynamically determines (such as via a dispatch controller of the command processor) a shader engine assignment for each workgroup of the plurality of workgroups generated in block 410. In the depicted embodiment, determining the shader engine assignment may be based at least in part on physical parameters 468 associated with each respective shader engine in the plurality of shader engines. As one non-limiting example, the physical parameters 468 may specify, for at least some of the communicatively coupled shader engines, a quantity of active compute units respectively associated with each shader engine. In this manner, the command processor may consider the processing capacity of one or more shader engines that respectively include a greater or lesser quantity of active compute units than others when determining whether to provide one or more workgroups to that shader engine. In addition, in certain embodiments and scenarios, determining the shader engine assignment may be based at least in part on an indicated quantity of current status information 470 respectively associated with each of multiple shader engines, such as may in certain embodiments be indicated via an SPI of the respective shader engine.

After determining a shader engine assignment for each workgroup, the routine proceeds to block 420, in which each workgroup is assigned to its determined shader engine.

At block 425, the command processor receives one or more indications of available resources respectively associated with each of at least some of the shader engines. It will be appreciated that in various scenarios and embodiments, such indications may be received by the command processor at various times, including prior to receiving the one or more workgroup assignments for processing by a respective shader engine, during the processing of one or more workgroup assignments by a respective shader engine, upon completion of processing of one or more workgroup assignments by a respective shader engine, etc. Thus, in certain embodiments, the command processor may maintain current status information 470 regarding workgroup assignment queues instantiated on each of the shader engines for use by the command processor (and/or dispatch controller) in determining shader engine assignments for workgroups in block 415.

At block 430, the command processor determines whether the processing of all pending commands have been completed. If not, the routine returns to block 415 to determine additional shader engine assignments for all remaining workgroups. Otherwise, the routine returns to block 405 to await additional commands (e.g., draw commands) for execution.

In some embodiments, the apparatus and techniques described above are implemented in a system including one or more integrated circuit (IC) devices (also referred to as integrated circuit packages or microchips), such as may comprise one or more elements of the GPUs described above with reference to FIGS. 1-3. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A graphics processing device, comprising:
a plurality of shader engines, wherein each shader engine of the plurality of shader engines includes a respective quantity of active physical resources;
a command processor coupled to the plurality of shader engines; and
a dispatch controller of the command processor to dynamically assign each workgroup of a plurality of workgroups to a respective shader engine for execution, the dynamic assignment based at least in part on an indication of the quantity of active physical resources associated with the respective shader engine.

2. The graphics processing device of claim 1, wherein the indication of the respective quantity of active physical resources associated with the respective shader engine indicates a respective quantity of active compute units associated with the respective shader engine.

3. The graphics processing device of claim 1, wherein the dispatch controller of the command processor is further to receive, from a first shader engine of the plurality of shader engines, one or more indications of active physical resources for the respective shader engine.

4. The graphics processing device of claim 1, wherein to dynamically assign each workgroup to a respective shader engine includes to dynamically assign each workgroup to a respective shader engine via a shader processor input (SPI) associated with the respective shader engine based at least in part on an indication of available physical resources associated with the respective shader engine that includes status information received by the command processor from the associated SPI.

5. The graphics processing device of claim 4, wherein the status information includes an indication of current progress of the respective shader engine with respect to processing one or more workgroups assigned to the respective shader engine.

6. The graphics processing device of claim 4, wherein the status information includes an indication of one or more available workgroup assignment slots of the respective shader engine.

7. The graphics processing device of claim 1, wherein the command processor is further to maintain current status information for each shader engine of the plurality of shader engines based at least in part on one or more indications of available physical resources respectively associated with each of the plurality of shader engines.

8. A method comprising:
generating, based on one or more received commands, a plurality of workgroups for assignment to a plurality of shader engines for processing, each shader engine of the plurality of shader engines including a respective quantity of active physical resources; and
dynamically assigning each workgroup of the plurality of workgroups to a respective shader engine for execution, the dynamic assigning based at least in part on an indication of the quantity of active physical resources associated with the respective shader engine.

9. The method of claim 8, wherein the indication of the quantity of the quantity of active physical resources associated with the respective shader engine indicates a respective quantity of active compute units associated with the respective shader engine.

10. The method of claim 8, further comprising receiving, by a dispatch controller of a command processor, one or more indications of active physical resources for a first shader engine of the plurality of shader engines from the first shader engine.

11. The method of claim 8, wherein dynamically assigning each workgroup to a respective shader engine includes dynamically assigning each workgroup to a respective shader engine via a shader processor input (SPI) associated with the respective shader engine based at least in part on an indication of available physical resources associated with the respective shader engine that includes status information received by a command processor from the associated SPI.

12. The method of claim 11, wherein the status information includes an indication of current progress of the respective shader engine in processing one or more workgroups assigned to the respective shader engine.

13. The method of claim 11, wherein the status information includes an indication of one or more available workgroup assignment slots of the respective shader engine.

14. The method of claim 8, further comprising maintaining, by a command processor, current status information for each shader engine of the plurality of shader engines based at least in part on one or more indications of active physical resources respectively associated with each of the plurality of shader engines.

15. A system, comprising:
a plurality of graphics processing devices, each graphics processing device of the plurality of graphics processing devices including:
a plurality of shader engines, wherein each shader engine of the plurality of shader engines includes a respective quantity of active physical resources;
a command processor coupled to the plurality of shader engines; and
a dispatch controller of the command processor to dynamically assign each workgroup of a plurality of workgroups to a respective shader engine for execution, the dynamic assignment based at least in part on an indication of the quantity of active physical resources associated with the respective shader engine;
wherein each dispatch controller of each graphics processing device of the plurality of graphics processing devices coordinates with one or more other dispatch controllers of one or more other graphics processing devices of the plurality of graphics processing devices to dynamically assign workgroups.

16. The system of claim 15, wherein each graphics processing device of the plurality of graphics processing devices comprises a graphics processing unit (GPU) chiplet.

17. The system of claim 15, wherein the dynamic assignment is based on an indication of active compute units respectively associated with each of one or more of the plurality of shader engines.

18. The system of claim 17, wherein the indication of active compute units associated with a first shader engine of the plurality of shader engines is provided by the first shader engine.

19. The system of claim 15, wherein the indication of active physical resources associated with a first shader engine of the plurality of shader engines includes status information for the first shader engine, and wherein the status information includes an indication of current progress of the first shader engine with respect to processing one or more workgroups assigned to the first shader engine.

20. The system of claim 15, wherein the command processor is further to maintain current status information for each shader engine of the plurality of shader engines based at least in part on one or more indications of active physical resources respectively associated with each of the plurality of shader engines.

\* \* \* \* \*